United States Patent [19]

Rasor

[11] 4,406,387

[45] Sep. 27, 1983

[54] ARTICLE CARRIER

[75] Inventor: William Rasor, Marysville, Mich.

[73] Assignee: Masco Corporation, Taylor, Mich.

[21] Appl. No.: 248,679

[22] Filed: Mar. 30, 1981

[51] Int. Cl.³ .............................................. B60R 9/04
[52] U.S. Cl. ..................................... 224/328; 220/4 E; 220/334
[58] Field of Search ............... 224/328, 319, 309, 316, 224/314, 325; 220/4 E, 4 B, 334; 24/221 K

[56] References Cited

U.S. PATENT DOCUMENTS

| | | | |
|---|---|---|---|
| 2,486,411 | 11/1949 | Huelster | 24/221 K |
| 2,705,575 | 4/1955 | Hammer | 220/334 |
| 2,920,802 | 1/1960 | Cook | 224/328 |
| 3,710,761 | 1/1973 | Gregory | 220/4 E X |
| 3,838,802 | 10/1974 | Grycel | 224/309 |

Primary Examiner—Steven M. Pollard
Attorney, Agent, or Firm—E. Dennis O'Connor; Steven L. Permut; Leon E. Redman

[57] ABSTRACT

An enclosed article carrier for mounting to an exterior surface of a motor vehicle. The article carrier has a pair of open hollow shells. One of the shells is fastened by a removable fastener to the surface of the motor vehicle. The removable fastener preferably is a quick-release fastener requiring simultaneous application of a rotational force and a force normal to the axis of application of the rotational force for engagement and disengagement. The second of the shells is preferably hinged to the first shell and swings over the lower shell to form an enclosed storage compartment. The second shell may be disengaged from the first shell, rotated one hundred and eighty degrees, and nested within the first shell to form an open article carrier.

18 Claims, 10 Drawing Figures

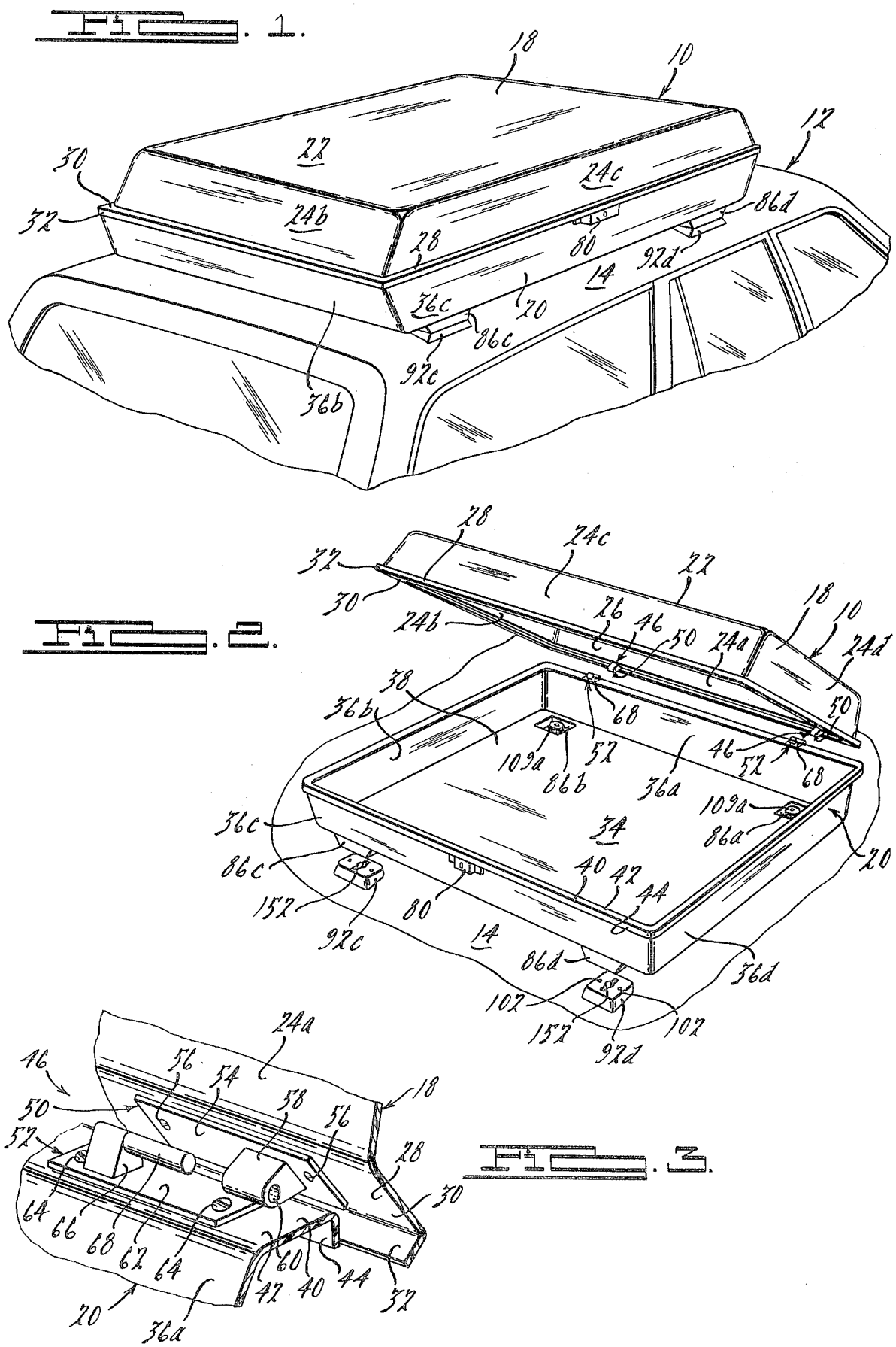

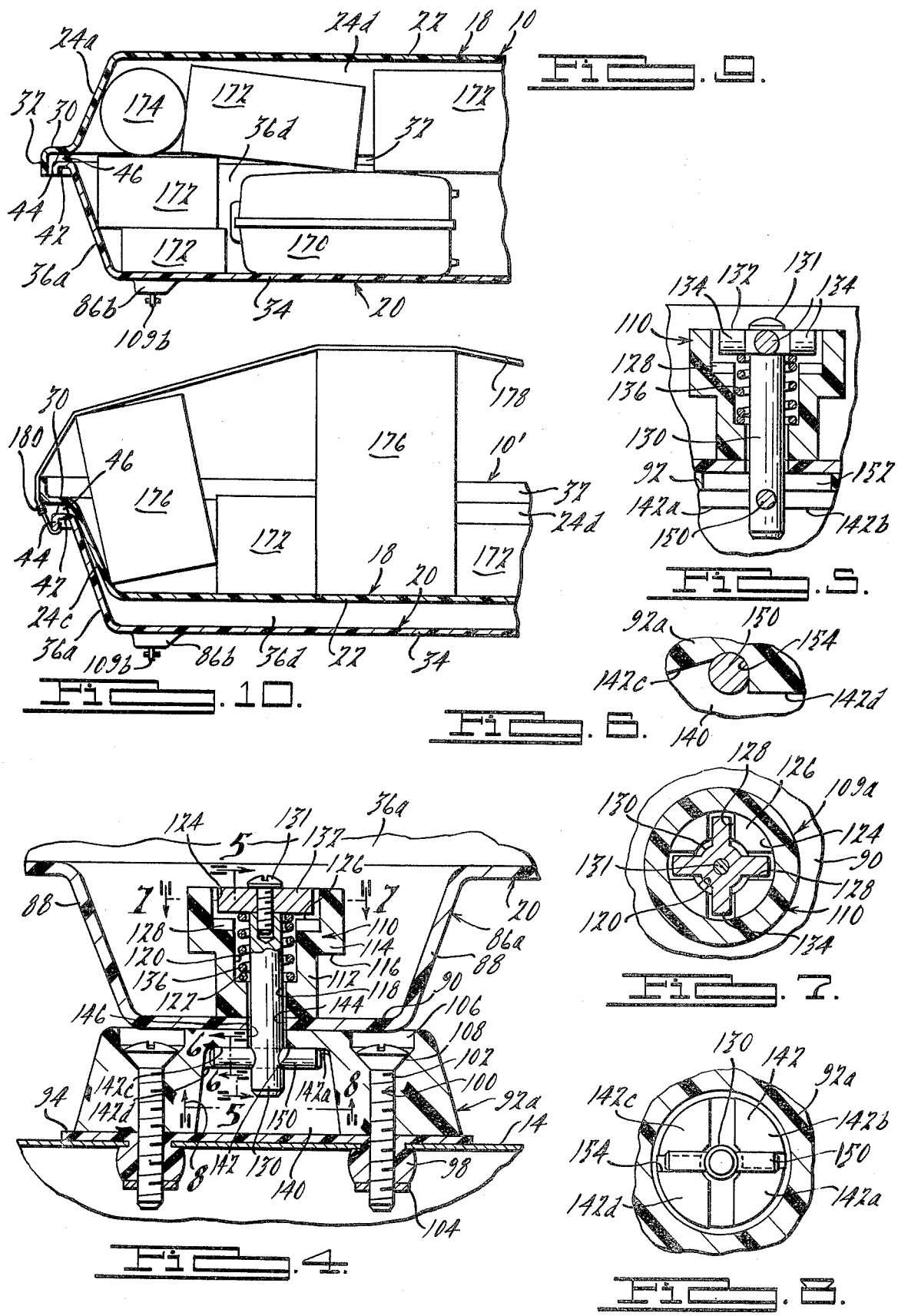

ARTICLE CARRIER

BACKGROUND OF THE INVENTION

The present invention relates to enclosed article carriers for mounting to an exterior surface of a motor vehicle and particularly to article carriers which may be easily removed from the surface of the vehicle for storage.

Various types of enclosed article carriers have been disclosed in the past. For example, the article carrier of U.S. Pat. No. 2,659,464 consists of a small boat hinged at its center. The two halves of the boat are folded together to form an enclosure therebetween. The boat is mounted to the roof by means of straps. The article carrier disclosed in U.S. Pat. No. 3,907,184 consists of a series of slats fastened to the roof of a vehicle in a spaced apart, parallel relationship. A cover is removably fastened to the first and to the last of the slats. The article carrier of U.S. Pat. No. 4,173,965 consists of a self-contained rectangular enclosure. Access to the interior of the enclosure is provided by two hinged side doors of the type sometimes known as "gull wing" doors.

The trend of recent years has been towards lighter weight motor vehicles so as to reduce the amount of fossil fuel that is consumed by each vehicle. The reduction of weight of vehicles and the consequent reduction of the exterior dimensions of the vehicles have often been accompanied by a reduction in interior space. While many engineering advances have helped to reduce exterior dimensions without a substantial loss of passenger comfort, there has been a substantial decrease in storage space available in many of the smaller cars. The storage space typically is insufficient when the vehicle is to be used for travel. Thus, there has been an increased need for a convenient and a safe means for carrying articles outside of the vehicle.

Unfortunately, there has also been an increasing amount of theft and malicious crime associated with motor vehicles. It is therefore desirable to have an article carrier with a locked internal article carrying compartment to inhibit theft. Such an article carrier should be easy to remove from the vehicle when the article carrier is not needed, but should be difficult or impossible to remove when the article carrier is in use and is locked. Such an article carrier should have provision for expanded carrying capacity beyond that provided in the enclosed space when more space is needed.

The primary object of the present invention is to provide an enclosed article carrier that may be rapidly removed from the vehicle when the article carrier is not in use. Another object of the present invention is to provide a lockable enclosed article carrier wherein the fasteners securing the article carrier to the vehicle are inaccessible when the article carrier is locked. Another object of the present invention is to provide an enclosed article carrier that is readily convertible into an open article carrier of increased capacity wherein the cover is stored in the article carrier. Still another object of the present invention is to provide an article carrier having fasteners removably securing the article carrier to the vehicle wherein the fasteners will not vibrate loose when the vehicle is in motion or be caused to be activated by a downward force. Still another object of the present invention is to provide such fasteners wherein the fasteners will not separate from the article carrier when the article carrier is not fastened to the vehicle.

SUMMARY

The present invention provides an enclosed article carrier for mounting to an exterior surface of a motor vehicle. The carrier has an open lower shell and an open upper shell. A quick-release fastener is provided for removably securing the lower shell to the surface. The upper shell is hinged to the lower shell and swings over the lower shell to form an enclosed storage compartment therebetween. The upper shell is disengaged from the lower shell to form an open article carrier. The upper shell may be rotated one hundred and eighty degrees and nested within the lower shell when the article carrier is to be used in the open configuration.

Preferably, the quick-release fastener is disposed within a hollow leg extending from and below the lower half shell. The quick-release fastener preferably comprises a cylindrical dial with an internal bore. A pin is partly disposed within the bore and reciprocates and rotates within the bore. A selectively engageable interlocking means is provided to prevent relative rotation between the pin and the dial. Biasing means bias the interlocking means out of engagement. Fastening means are provided at one end of the pin for fastening the pin to the surface, the fastening means being of a type engaged and disengaged by rotation of the pin. The quick-release fastener is operated by an upward motion to engage the interlocking means and by rotation of the dial.

BRIEF DESCRIPTION OF THE DRAWING

The many objects and advantages of the present invention will become apparent to those skilled in the art when the following detailed description of the preferred embodiment is read together with the appended drawings.

FIG. 1 is a perspective view of the preferred embodiment of the article carrier of the present invention illustrated mounted to a roof of a motor vehicle;

FIG. 2 is an exploded perspective view of the article carrier and a portion of the roof of FIG. 1;

FIG. 3 is an enlarged exploded perspective view of a portion of the article carrier of FIG. 2 illustrating one of the hinges thereof;

FIG. 4 is a partial vertical sectional view taken through one leg and one base pad of FIG. 1 and showing a fastening means therebetween;

FIGS. 5 through 8 are partial sectional views taken along lines 5—5 through 8—8, respectively, of FIG. 4;

FIG. 9 is a partial vertical sectional view taken through the article carrier of FIG. 1 showing the article carrier in the closed configuration; and FIG. 10 is a view similar to FIG. 9 showing the article carrier of FIG. 1 in the opened configuration.

DETAILED DESCRIPTION OF THE PREFERRED EMBODIMENT

Referring now to the drawing and particularly to FIG. 1 thereof, the present invention comprises an article carrier 10 adapted to be fastened to an exterior sheet metal surface of a motor vehicle 12. In the example illustrated, the article carrier 10 is shown fastened to the roof 14 of the motor vehicle 12. It is understood, however, that the article carrier may be fastened to the rear deck of the motor vehicle 12 or to any other suitable substantially flat exterior surface.

As best shown in FIGS. 1 and 2, the article carrier 10 comprises an enclosure having a top shell 18 and a bottom shell 20. Each of the shells 18 and 20 are preferably formed of fiberglass. Alternatively, they may be formed from sheet metal or plastic by well known methods.

The top shell 18 has a flat rectangular upper wall 22 and four downwardly oriented sidewalls 24a, 24b, 24c, and 24d. The sidewalls 24a through 24d are each trapezoidal in shape, the sidewalls being narrowest near the upper wall 22. The sidewalls 24a through 24d thus slope outwardly away from the upper wall 22. The top shell 18 further has an open lower end 26, as shown in FIG. 2. A perimetal lip 28 is provided around the open end 26. The lip 28, best shown in FIGS. 8 and 9, consists of a continuous outwardly facing web 30 extending from the lower ends of the sidewalls 24a through 24d and a downwardly facing rib 32 extending from the web 30.

The bottom shell 20, best shown in FIG. 2, is similar to the top shell 18. The bottom shell 20 has a flat rectangular lower wall 34 and four upwardly oriented sidewalls 36a, 36b, 36c, and 36d. The sidewalls 36a through 36d are trapezoidal in shape and slope upwardly and outwardly away from the wall 34. The bottom shell 20 also has an open end 38. A perimetal lip 40, (FIGS. 8 and 9), is provided around the open end 38, the lip 40 consisting of a horizontal outwardly facing web 42 and a vertical downwardly facing rib 44.

The top shell 18 is removably hinged to the bottom shell 20 by means of a pair of identical hinges 46 (FIG. 2). One hinge 46 is illustrated in detail in FIG. 3. The hinge 46 has a female upper hinge member 50 and a male lower hinge member 52. The upper hinge member 50 has a flat plate 54. The plate 54 is secured by screws 56 to the underside of the portion of the web 30 that is near the sidewall 24a. A female stanchion 58 extends from the plate 54. A horizontal bore 60 is provided through the stanchion 58.

The lower hinge member 52 has a plate 62 fastened to the upper side of the portion of the web 42 that is near the sidewall 36a by means of screws 64. A male stanchion 66 extends from the plate 62. The stanchion 66 has a horizontally disposed hinge pin 68 fastened thereto and extending therefrom. When assembled, the hinge pin 68 of the hinge 46 is inserted into the bore 60 in the upper hinge member 50.

As shown in FIGS. 1 and 2, a lock assembly 80 is provided to secure the top shell 18 in the closed position. The lock assembly 80 is mounted to the sidewalls 24c and 36c. The sidewalls 24c and 36c are the sidewalls opposite the sidewalls 24a and 36a where the hinge 46 is located.

The lock assembly 80 is not shown in detail in the drawing since it may be selected from the many locks well known in the art. The lock 80 is not a part of the present invention but is included in the preferred embodiment. Preferably, the lock assembly 80 is of the key operated or combination operated type so as to inhibit theft.

As illustrated in FIG. 2, four identical hollow legs 86a, 86b, 86c, and 86d are provided in the lower wall 34 of the bottom shell 20. One of the legs 86 is illustrated in detail in FIG. 4 of the drawing. The leg 86a is formed with the material of the lower wall 34 of the shell 20. The leg 86a has four sidewalls 88 extending downwardly from the wall 34. The leg 86a further has a square bottom wall or base 90.

Each leg 86a through 86d rests on one of four identical resilient pads 92a, 92b, 92c, and 92d. Two of the pads 92c and 92d are illustrated in FIGS. 1 and 2. Pad 92d is illustrated in FIGS. 8 and 9. Pad 92a is shown in detail in FIG. 4.

The pad 92a is a squat rectangular unit molded from a resilient plastic material. The pad 92a rests on a flat rectangular platform 94. The platform 94 may be comprised of the same material as the pad 92a. Each platform 94 rests on the roof 14 of the motor vehicle. The pad 92a and platform 94 may be joined together by an adhesive so that they may be easily permanently fastened to the roof 14 as a unit. Alternatively, the pad 92a and the platforms 94 may be molded as a unit by use of a collapsible mold.

A pair of bosses 98 extend downwardly from the platform 94. Each boss 98 is inserted through an aperture in the roof 14. Each boss 98 has approximately the same diameter as the aperture when the boss is unstressed, not shown in the drawing. A vertical bore 100 is provided through each of the bosses 98 and through the pad 92. Each of a pair of screws 102 passes from above the pad 92 through one of the bores 100. A nut 104 is fastened to the end of each screw 102 to secure the pad 92 and platform 94 to the roof 14. The nuts 104 compress the bosses 98, and cause the bosses 98 to flatten out, as shown in FIG. 4. The bosses 98 thereby anchor the platform 94 to the roof 14 and seal the aperture against leakage of rain into the passenger compartment.

A counterbore 106 is provided at the top of each bore 100. The counterbores 106 are recesses for the heads 108 of the screws 102. The counterbores 106 and thus the screws 102 are hidden from view and are inaccessible when the leg 86a is resting on the pad 92a.

Four identical quick-release fasteners 109a, 109b, 109c, and 109d are provided, each fastener 109a through 109d fastening the base 90 of one of the legs 86a through 86d to the corresponding pads 92a through 92b. Two quick-release fasteners 109a and 109b are illustrated at FIG. 2. Fasteners 109c and 109d are not shown in the drawing.

The details of a representative fastener, fastener 109a, are depicted in the drawing in FIGS. 4 through 8. The fastener 109a has an actuating dial 110 resting on the base 90 of the leg 86a. Preferably, the dial 110 is a plastic member and does not extend above the height of the sidewalls 88 of the leg 86a.

The dial 110 is best illustrated in FIG. 4. The actuating dial 110 has a cylindrical lower portion 112 having a vertical longitudinal axis. The actuating dial 110 further has a cylindrical upper portion 114 coaxial with the lower cylindrical portion 112 but having a larger diameter. A horizontal external shoulder 116 is formed between the lower portion 112 and the upper portion 114.

The dial 110 is provided with three coaxial vertical internal bores. Each bore is coaxial with the cylindrical portions 112 and 114 of the dial 110. The first bore 118 passes entirely through the dial 110. The second bore is a counterbore 120 that passes partly through the dial 110 from above. A shoulder 122 is formed between the bore 118 and the counterbore 120. The third bore is another counterbore 124 which is shallower than the counterbore 120. The counterbore 124 also passes partly through the dial 110 from above. A shoulder 126 is formed between the shallow counterbore 124 and the intermediate counterbore 120. Four rectangular radial flutes or slots 128, best shown in FIG. 7, are provided in the surface of the shoulder 126. The slots 128 are disposed at ninety degree intervals.

A pin 130 (FIG. 4) is disposed in the bore 118 and reciprocates and rotates therein. The pin 130 is fastened by means of a screw 131 to a T-bar or head 132 located in the counterbore 124. The outer diameter of the head 132 is less than the inner diameter of the intermediate counterbore 120, as shown in FIG. 7. The upper portion of the head 132 is a disk 133 (FIG. 5). Four identical radial arms 134 extend outwardly from the head 132 below the disk 133 of the pin 130 at ninety degree intervals. Each arm 134 is smaller in width and in length than the radial slots 128 in the shoulder 126.

When the pin 130 is rotated to the position shown in FIG. 7, each arm 134 is directly above one of the slots 128. The pin 130 may be lowered further into the bore 118 with each of the arms 134 fitting into one of the slots 128. It should be noted that in this lowered position, the slots 128 and the arms 134 each act as abutment means. The abutment means act together as interlocking means selectively engaged to prevent relative rotation between the pin 130 and the dial 110.

A coil compression spring 136 (FIG. 4) is provided between the shoulder 122 of the dial 110 and the head 132 of the pin 130. The spring 136 biases the pin 130 upwardly and thus biases the arms 134 away from the slots 128. Thus, in the absence of a normal force on the pin 130 to counter the effect of the spring 136, the dial 110 rotates independently of the pin 130.

A cylindrical recess 140 (FIG. 4) having an upper surface 142 is provided in the underside of the pad 92a. The shaft of the pin 130 passes downwardly through a hole 144 in the base 90 of the leg 86a. The shaft of the pin 130 passes through a hole 146 in the pad 92a and out into the recess 140. A pin 150 having a diameter smaller than the diameter of pin 130 is fitted into a transverse bore through the shaft of the pin 130 near the end of the shaft that is within the recess 140. A slot 152 (FIGS. 2 and 8) is provided through the pad 92 for passage of the dowel pin 150 and the pin 130 therethrough. The centerline of the slot 152 passes through the center of the hole 146 of FIG. 4.

A pair of colinear radial detent slots 154 are provided in the upper surface 142 of the recess 140. The detent slots 154 are preferably perpendicular to the slot 152. As shown in FIG. 8, the detent slots 154 and the slots 152 divide the surface 142 into four quadrants, 142a, 142b, 142c, and 142d. The surfaces of two diagonally opposite quadrants 142a and 142c are sloped, as shown in FIGS. 4 and 6.

When the article carrier 10 is to be used, the bottom shell 20 is placed on the roof 14 with each leg 86a through 86d resting on one of the pads 92a through 92d. Each fastener 109a through 109d is in turn operated to fasten each leg to a pad.

Use of the fastener is best understood by referring to FIGS. 4, 7, and 8. The user may most conveniently operate the fastening means by placing his thumb on the head 132 of the pin 130 and positioning his next two fingers under the shoulder 116 of the dial 110 with one of the two fingers on either side of the lower cylindrical portion 112. When the user first pulls up on the dial 110, the dowel pin 150 abuts the underside of the base 90 and the arms 134 abut the shoulder 126. When the user pulls up on the dial 110 and turns it, the radial arms 134 eventually come into contact with the slots 128 in the shoulder 122 of the dial 110, as shown in FIG. 7. At this point, the dial 110 will rise slightly until the arms 134 are resting on the lower surface of the slots 128.

Once the arms 134 have been lined up with the slots 128, they act together as interlocking means preventing relative rotation between the dial 110 and the pin 130. At this point, to fasten the lower shell 20 to the roof 14, the user continues to press down on the head 132 of the pin 130 with his thumb and simultaneously lowers the entire fastener 109a until it is resting on the base 90 of the leg. While continuing to press down on the head 132, the user rotates the dial 110 until the dowel pin 150 passes through the slot 152 in the pad 92a. The user continues to press down on the head 132 and to simultaneously turn the dial 110 clockwise another ninety degrees as viewed from FIG. 7 until the dowel pin 150 is aligned with the detent slots 154 as shown in FIGS. 5 and 8. When the fastener is released, the spring 136 biases the pin 130 upwardly and thereby maintains the dowel pin 150 in the detent slots 154.

The above described procedure is repeated for each of the fasteners 109a through 109d to fasten the bottom shell 20 to the roof 14 of the motor vehicle 12.

The quick-release fasteners 109a through 109d are detached from the pads 92a through 92d by pulling upwardly on the dial 110 and turning the dial counter-clockwise as viewed from FIG. 8. After the dial is turned a maximum of ninety degrees, the arms 134 will engage the slots 128. At this point, the rotational force on the dial 110 is transmitted to the pin 130. The rotational force on the pin 130 overcomes the resistance of the sidewalls of the detent slots 154. Thus, the fasteners 109a through 109d are released by at most a total of one hundred and eighty degrees of rotation of the dial 110. Nonetheless, the fasteners will not accidentally disengage due to articles pressing upon the pin since an upward motion of the dial is necessary to operate any fastener.

Once the bottom shell 20 has been fastened to the vehicle 12, the top shell 18 may be fastened to the bottom shell 20 in one of two functional orientations. As described earlier, the top shell 18 may be hingedly fastened to the bottom shell 20 by the hinges 46 and 48 and may be secured thereto by the lock 80. As shown in FIGS. 1 and 9, the two shells 18 and 20 form an enclosed article carrier when the open end 26 of the upper shell 18 is directly over the open end 38 of the lower shell 20.

In the closed configuration of the article carrier 10, cargo such as suitcases 170, boxes 172, and sleeping bags 174, may be stored within the cargo compartment. The cargo will be protected from rain and sun by the top shell 18. A removable protective mat, not shown, may be placed over the upper surface of the lower wall 24 to prevent small items from falling into the hollow leg 86a through 86d. The cargo is protected from theft by the lock 80.

In the closed configuration, the lip 28 of the upper shell 18 rests over and surrounds the lip 40 of the lower shell 20. If desired, a sealing gasket, not illustrated, may be provided around the lower edge of the web 30 to thermally insulate the storage compartment of the article carrier 10 and to reduce the amount of road dirt and moisture that can enter the storage compartment.

One of the features of the preferred embodiment of the article carrier 10 of the present invention is the location of the fasteners. The fasteners are designed to be inaccessible to any potential thief. To separate the quick-release fasteners 109a through 109d from the pads 92a through 92d, the top shell 18 must be opened, removed or destroyed. Furthermore, the base 90 of each leg 86a through 86d prevents access to the screws 102 securing the pads 92a through 92d to the roof 14.

FIG. 10 illustrates the second functional orientation for the top shell 18. In this configuration, the top shell 18 is nested inside of the bottom shell 20 with its open end 38 facing upwardly to form an open article carrier 10'. Larger cargo, such as boxes 176 may be carried in the opened article carrier 10' than may be carried in the closed article carrier 10 of FIG. 9. It should be noticed that since the upper shell 18 nests within the lower shell 20, there is no need to take up valuable storage space inside the vehicle to store the upper shell 18.

Ropes 178 are shown in the drawing to secure the boxes 176 in the article carrier 10'. Alternatively, other fasteners such as tying cords, netting, chains or straps may be used. Each end of the rope 178 is fastened to the lip 40 of the lower shell 20 by means of a hook 180. Each rope 178 thus secures the cargo within the article carrier 10' and further keeps the top shell 18 securely within the bottom shell 20.

It should be noticed that the cargo in the article carrier 10' of FIG. 10 and the article carrier 10' itself are far more vulnerable to theft and vandalism than the article carrier 10 of FIG. 9. It is provided, however, so that increased cargo carrying capacity is available when needed.

From the above description, it can readily be appreciated that the present invention provides an enclosed article carrier that may be rapidly removed from the vehicle and that may be easily converted into an open article carrier. The article carrier of the present invention inhibits theft by being fastened to the vehicle in a manner that makes the fasteners securing it to the motor vehicle inaccessible when the article carrier is closed. The fasteners are preferably disposed inside of hollow legs below the storage compartment and thus do not protrude into the storage area of the article carrier. The article carrier has quick-release fasteners which are easy to operate yet unlikely to vibrate loose when the vehicle is in motion. Furthermore, operation of the fasteners requires that the dial be raised, thus preventing accidental engagement of the fastener by the articles inside the carrier. Finally, the article carrier has fasteners which won't separate from the article carrier when the article carrier is disconnected from the vehicle.

The above constitutes a detailed description of the best mode contemplated at the time of filing for carrying out the present invention. Modifications and variations not departing from the spirit thereof will be apparent to those skilled in the art and are included within the scope of the appended claims. What is claimed as novel is as follows:

I claim:

1. An article carrier for mounting to an exterior surface of a motor vehicle, said article carrier comprising a pair of hollow shells each having an inside, an outside and an open end, one of said shells being capable of being selectively nested partly inside of the other of said shells, said article carrier further comprising a first fastening means fastening said other shell to said surface and a second fastening means removably fastening said shells together in a configuration with said open ends adjacent to each other wherein said shells define therebetween an enclosed article carrying compartment; and further wherein said first fastening means comprises female fastening means fastened to said surface, a dial disposed within said other shell and having a bore therethrough, a shoulder in said dial adjacent to said bore, a pin passing through said bore, an enlargement affixed to said pin and disposed adjacent to said shoulder and limiting the reciprocal movement of said pin within said bore, male fastening means affixed to said pin near one end of said pin and selectively engageable with said female means by rotation of said pin about its longitudinal axis, and selectively engageable interlocking means preventing relative rotation between said pin and said dial whereby said male fastening means and said female fastening means are fastened together and are unfastened by selective engagement of said interlocking means and rotation of said dial.

2. The article carrier of claim 1 wherein said interlocking means comprises abutment means on said enlargement; abutment means on said shoulder cooperating with said abutment means on said enlargement; and biasing means urging said enlargement away from said shoulder whereby when said enlargement and said shoulder are selectively engaged against the force of said biasing means, said two abutment means cooperate to prevent relative rotation between said pin and said dial.

3. The article carrier of claim 2 wherein said enlargement comprises a head on the end of said pin furthest from said male fastening means; wherein said abutment means on said head comprises a radial arm extending from said head and wherein said abutment means on said shoulder comprises a slot in the surface of said shoulder, said radial arm being selectively inserted into said slot to prevent relative rotation between said pin and said dial.

4. An article carrier for mounting to an exterior surface of a motor vehicle, said article carrier comprising:
a pair of hollow shells, each having an inside, an outside and an open end, one of said shells being capable of being selectively nested partly inside of the other of said shells, said shells being removably and hingedly fastened together to create an enclosed article compartment therebetween;
a female fastening means fastened to said surface;
a hollow leg extending from said other shell;
a dial disposed within said leg and having a bore therethrough;
a pin passing through said bore and through a hole in said leg and having one end outside of said shell;
male fastening means affixed to said pin near said one end and selectively engageable with said female means by rotation of said pin about its longitudinal axis;
abutment means on said pin; and
abutment means on said dial selectively movable to cooperate with said abutment means on said pin to prevent relative rotation therebetween whereby said other shell and said surface are fastened together and are unfastened by selective engagement of said abutment means and rotation of said dial.

5. The article carrier of claim 4 wherein said abutment means are selectively engaged by moving said female fastening means away from said leg.

6. The article carrier of claim 4 wherein said male fastening means comprises a dowel pin fitted into a transverse bore through the longitudinal axis of said pin near the end of said pin and further wherein said female fastening means comprises an element fastened to said surface, said element having a slot therethrough whereby said end of said pin and said dowel pin are selectively insertable through said slot and rotatable therebehind for fastening.

7. The article carrier of claim 4 wherein said abutment means on said pin comprises radial extensions therefrom and wherein said abutment means on said dial comprises radial slots in said dial, said radial extensions being selectively reciprocable into and out of engagement with said slots.

8. The article carrier of claim 4 having four of each of said hollow legs, said female fastening means, said dials, and said pins; each of said legs being fastened to one of said female fastening means by one of said dials and one of said pins.

9. An article carrier for mounting to an exterior surface of a motor vehicle, said article carrier comprising a hollow shell defining an article storage compartment and comprising fastening means removably fastening said shell to said surface; wherein said fastening means comprises female fastening means fastened to said surface, a dial disposed within said shell and having a bore therethrough, a pin passing through said bore, male fastening means affixed to one end of said pin and selectively engageable with said female means, and selectively engageable interlocking means preventing relative rotation between said pin and said dial.

10. The article carrier of claim 9 wherein said interlocking means comprises abutment means on said pin, abutment means on said dial cooperating with said abutment means on said pin and biasing means urging said abutment means away from each other whereby when said abutment means are selectively engaged against the force of said biasing means, said two abutment means cooperate to prevent relative rotation between said pin and said dial.

11. The article carrier of claim 9 wherein said abutment means are selectively engaged by moving said dial away from said shell.

12. The article carrier of claim 11 wherein said male fastening means and said female fastening means are fastened together and unfastened by selective engagement of said interlocking means and rotation of said dial.

13. The article carrier of claim 12 wherein said interlocking means is selectively engaged by moving said dial away from said shell.

14. The article carrier of claim 9 further comprising a shoulder in said dial adjacent to said bore and an enlargement affixed to said pin and disposed adjacent to said shoulder, said shoulder and said enlargement cooperating to limit the reciprocal movement of said pin within said bore.

15. The article carrier of claim 14 wherein said enlargement comprises a head on the end of said pin furthest from said male fastening means and wherein said interlocking means comprises a radial arm extending from said head and a slot in the surface of said shoulder, said radial arm being selectively inserted into said slot to prevent relative rotation between said pin and said dial.

16. The article carrier of claim 14 wherein said male fastening means comprises a dowel pin fitted into a transverse bore through the longitudinal axis of said pin near the end of said pin and further wherein said female fastening means comprises an element fastened to said surface, said element having a slot therethrough whereby said end of said pin and said dowel pin are selectively insertable through said slot and rotatable therebehind for fastening.

17. The article carrier of claim 9 further comprising a hollow leg extending exteriorly from said shell wherein said fastening means is disposed partly within said leg.

18. The article carrier of claim 9 further comprising a second hollow shell removably and hingedly fastened to said first recited hollow shell and hingable to cover said first recited hollow shell to create therebetween an enclosed article compartment.

* * * * *